US007491885B2

(12) United States Patent
Adachi et al.

(10) Patent No.: US 7,491,885 B2
(45) Date of Patent: Feb. 17, 2009

(54) POLYMER BUSHING AND CABLE TERMINATION USING THE SAME

(75) Inventors: Kazuhisa Adachi, Kawasaki (JP); Nobuyuki Sema, Kawasaki (JP)

(73) Assignee: SWCC Showa Cable Systems Co., Ltd. (JP)

( * ) Notice: Subject to any disclaimer, the term of this patent is extended or adjusted under 35 U.S.C. 154(b) by 266 days.

(21) Appl. No.: 10/572,798

(22) PCT Filed: Sep. 16, 2004

(86) PCT No.: PCT/JP2004/014002

§ 371 (c)(1), (2), (4) Date: Mar. 22, 2006

(87) PCT Pub. No.: WO2005/036708

PCT Pub. Date: Apr. 21, 2005

(65) Prior Publication Data

US 2007/0000680 A1    Jan. 4, 2007

(30) Foreign Application Priority Data

Oct. 8, 2003 (JP) ............................. 2003-350064

(51) Int. Cl.
*H01R 24/06* (2006.01)
(52) U.S. Cl. .................................................. 174/73.1
(58) Field of Classification Search ................ 174/73.1, 174/74 R
See application file for complete search history.

(56) References Cited

U.S. PATENT DOCUMENTS

| 3,595,984 | A | * | 7/1971 | Tachick | ..................... | 174/12 R |
| 4,398,125 | A | * | 8/1983 | Gerry | .......................... | 315/86 |
| 5,206,780 | A | * | 4/1993 | Varreng | ...................... | 361/117 |
| 6,074,229 | A | * | 6/2000 | Johansson | ................... | 439/181 |

(Continued)

FOREIGN PATENT DOCUMENTS

JP    H02-290120    11/1990

(Continued)

*Primary Examiner*—Chau N Nguyen
(74) *Attorney, Agent, or Firm*—Bacon & Thomas, PLLC (57) ABSTRACT

It is intended to achieve the weight reduction, sliming, and downsizing of bushings, compatibility of types of bushings, and simplification of operating steps. A polymer bushing comprises a conductor draw-out bar (1) having a conductor insertion hole (1a) in the lower end, a hard insulation sleeve (2) installed around the outer periphery of the conductor draw-out bar (1), a polymer clad body (3) installed around the outer periphery of the insulation sleeve (2), and an electric field stress-control layer installed on the interface between the insulation sleeve (2) and the polymer clad body (3). The insulation sleeve (2) comprises a large-diameter insulation sleeve (2a) installed around the outer periphery of the lower region of the conductor draw-out bar (1), and a small-diameter insulation sleeve (2b) installed around the outer periphery of a portion of the conductor draw-out bar (1) excluding the front end. An embedment metal part (4) for electric field mitigation purposes is embedded in a portion of connection between the large-and small-diameter insulation sleeves (2a, 2b). Further, installed at the lower end of the large-diameter insulation sleeve (2a) is a cone-shaped receiving port (5) for receiving the stress cone (13) of a cable terminal (11), the receiving port (5) communicating with the conductor insertion hole (1a) in the conductor draw-out bar (1).

13 Claims, 10 Drawing Sheets

U.S. PATENT DOCUMENTS

| | | | |
|---|---|---|---|
| 6,677,528 B2 | 1/2004 | Amerpohl et al. | 174/73.1 |
| 2002/0056564 A1* | 5/2002 | Quaggia | 174/74 R |
| 2003/0003802 A1 | 1/2003 | Amerpohl et al. | 439/587 |

FOREIGN PATENT DOCUMENTS

| | | |
|---|---|---|
| JP | 6-5339 U | 1/1994 |
| JP | 11-203970 | 7/1999 |
| JP | 11-341664 | 10/1999 |
| JP | 2001-126562 | 11/2001 |
| JP | 2002-105432 | 4/2002 |
| JP | 2003-304632 | 10/2003 |
| WO | 97/09762 | 3/1997 |
| WO | 98/45917 | 10/1998 |

* cited by examiner

POLYMER BUSHING AND CABLE TERMINATION USING THE SAME

TECHNICAL FIELD

This invention relates to a polymer bushing and a cable termination using the polymer bushing. More particularly, it relates to a polymer bushing which can achieve the simplification of a structure, the reductions of a weight, a size and a length, and the facilitation of on-site execution, which need not be filled with an insulating compound such as insulating oil or insulating gas, and which is well suited for installation in a substation of low ceiling or on the cross arm of a pylon, and a cable termination which uses the polymer bushing.

BACKGROUND ART

Figure 8:
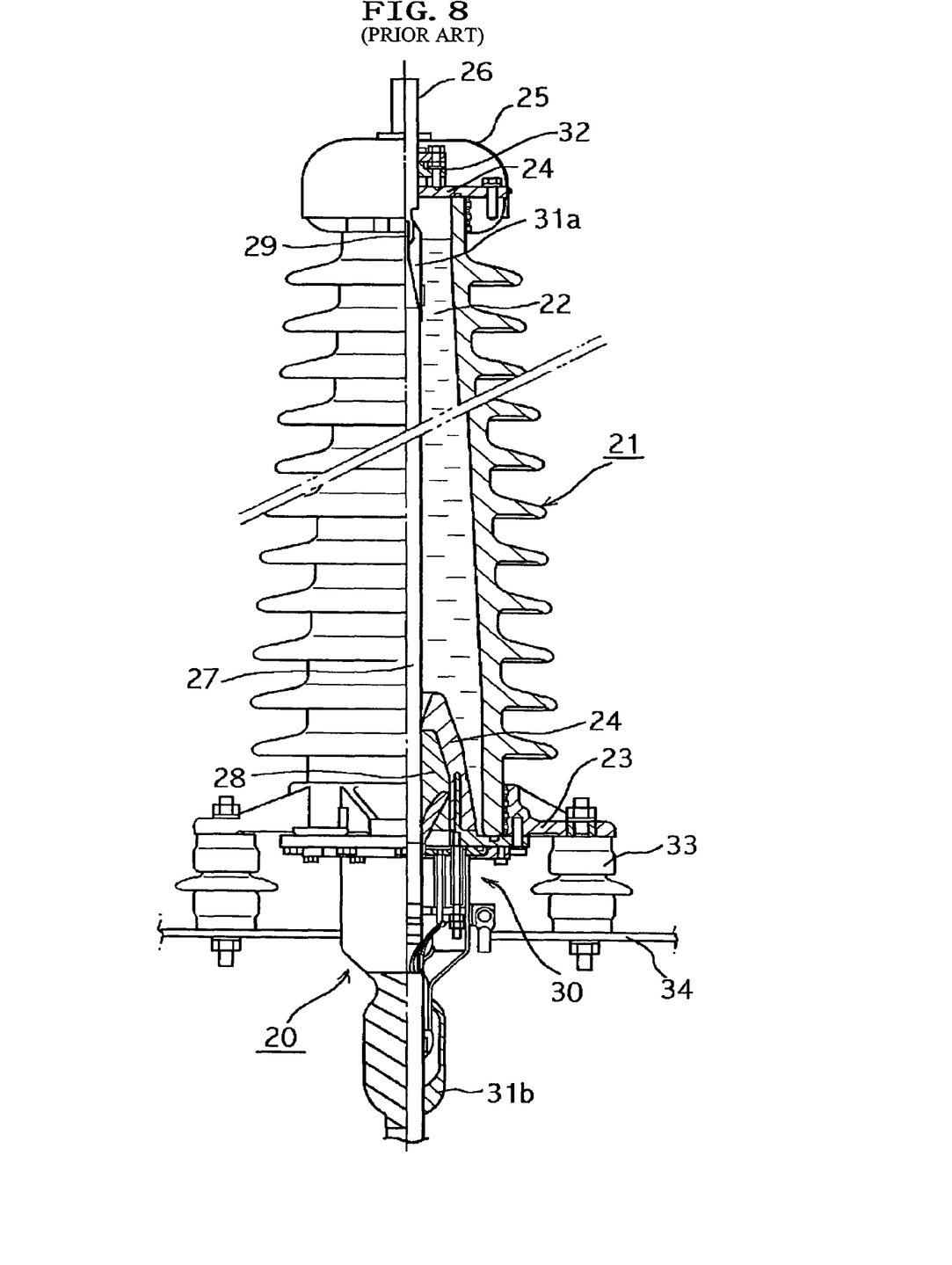
FIG. 8 is a partly sectional view of a cable termination in the prior art.

Heretofore, as a cable termination of this type, one constructed as shown in FIG. 8 has been known. Referring to the figure, the cable termination in the prior art includes a cable terminal 20, and a porcelain jacket 21 which envelops the cable terminal 20 and which is filled with an insulating compound 22 such as insulating oil or insulating gas.

Here, an annular bottom metal fitting 23 is mounted on the bottom part of the porcelain jacket 21, and an epoxy seat 24 is disposed concentrically with the porcelain jacket 21 at the lower part of the interior of the porcelain jacket 21. Besides, an upper metal fitting 24 and an upper covering 25 are respectively disposed at the top part of the porcelain jacket 21, and a conductor draw-out bar 26 is disposed concentrically with the porcelain jacket 21 at the upper central part of interior of the porcelain jacket 21. Incidentally, the lower end part of the conductor draw-out bar 26 is located within the porcelain jacket 21, and the distal end part thereof is gastightly led out upwards from the central parts of the upper metal fitting 24 and the upper covering 25.

Besides, a stress cone 28 is mounted on the outer periphery of a cable insulator 27 constituting the cable terminal 20, and a cable conductor 29 is attached to the distal end part of a cable conductor (not shown). By the way, in the figure, numeral 30 designates a pressing device which presses the stress cone 28; each of signs 31a and 31b, a sealing portion; numeral 32, a clamp metal fitting; numeral 33, a supporting insulator; and numeral 34, a supporting stand.

In the cable termination of such a construction, the conductor terminal 29 is connected to that lower end part of the conductor draw-out bar 26 which is located within the porcelain jacket 21, and the outer surface of the stress cone 28 is held in pressed contact with the inwall surface of the epoxy seat 24.

In the cable termination of such a construction, however, the connection node between the conductor terminal 29 and the conductor draw-out bar 26 exists in the interior of the porcelain jacket 21, and there have been drawbacks as stated below.

In the first place, there has been the drawback that, since the epoxy seat for receiving the stress cone exists inside the porcelain jacket, the diameter of the porcelain jacket enlarges accordingly, resulting in the heavy weight of the porcelain jacket.

Secondly, there has been the drawback that, when the outside diameter of the porcelain jacket enlarges, the projection cross-sectional area thereof becomes large, resulting in the degradation of the characteristic of the pollution withstand voltage of the porcelain jacket, so an elongated porcelain jacket must be used to keep a predetermined characteristic of pollution withstand voltage.

Thirdly, the porcelain jacket is filled with the insulating compound, so that when the porcelain jacket has broken down, the insulating compound might flow out of this porcelain jacket to cause a secondary disaster.

Fourthly, there has been the drawback that, since the components such as epoxy seat, upper covering and clamp metal fitting are required, a large number of components and a complicated structure are involved.

Figure 9:
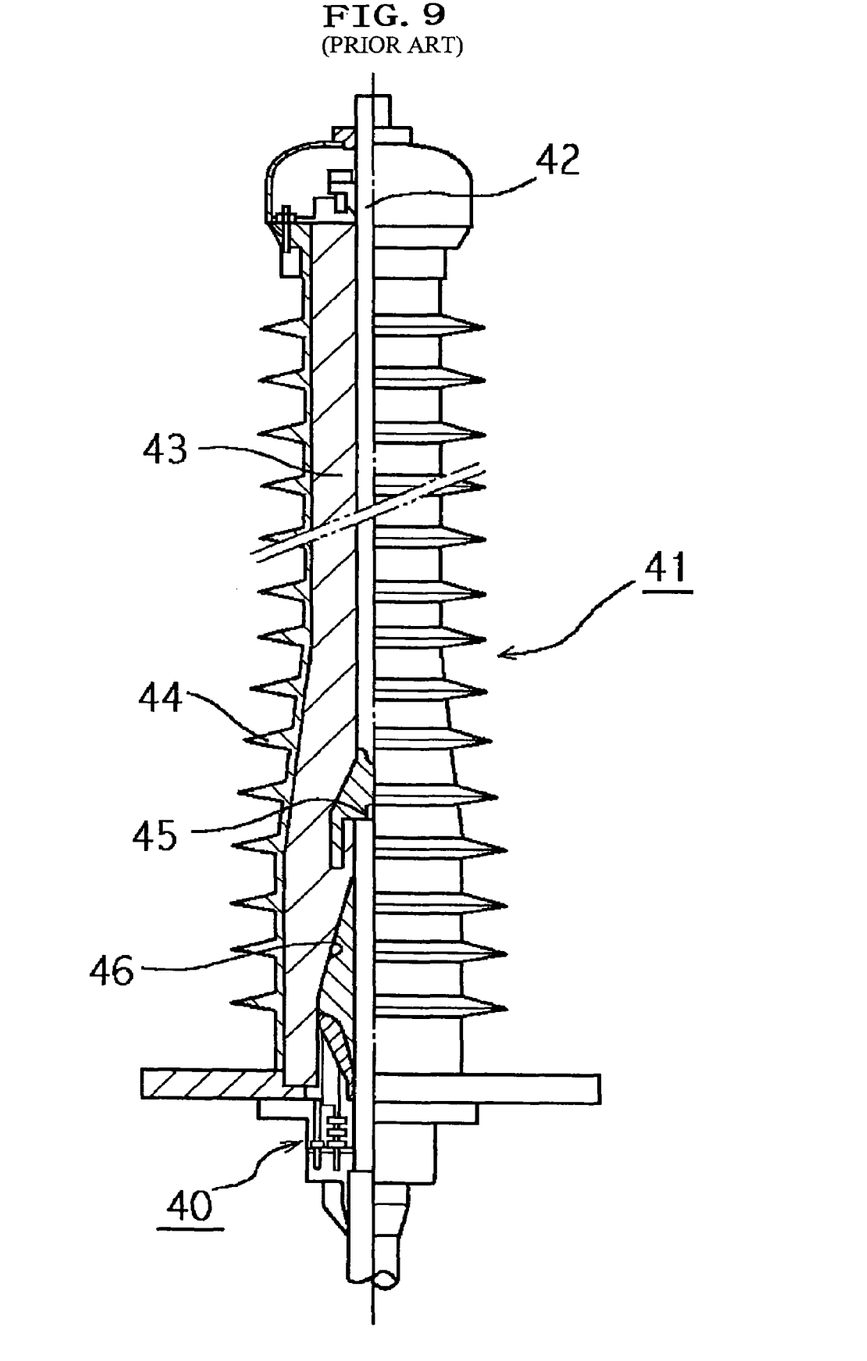
FIG. 9 is a partly sectional view of a cable termination in the prior art.

In view of these drawbacks, there have been developed (I) a cable termination wherein a polymer bushing is used instead of the porcelain jacket 21 shown in FIG. 8, and wherein the polymer bushing is filled with an insulating oil or insulating gas, and (II) a cable termination wherein, as shown in FIG. 9, a cable terminal 40 is mounted in a receiving port 46 of a polymer bushing 41 which includes a conductor draw-out bar 42 that is centrally disposed, a hard insulation sleeve 43 that is disposed on the outer periphery of the conductor draw-out bar 42, and a polymer clad body 44 that is provided integrally with the outer periphery of the insulation sleeve 43.

In the cable termination (I), however, the bushing is formed of a polymer being a high-molecular material, so that a water content might penetrate therethrough from outside to mix into the insulating oil or insulating gas contained in the polymer bushing, and to deteriorate the performance of the insulating oil or insulating gas. Besides, in the cable termination (II), any epoxy seat for receiving a stress cone does not exist inside the polymer bushing 41, and this polymer bushing 41 need not be filled with any insulating compound, so that the structure of the polymer bushing 41 can be simplified, and the weight thereof can be lightened. As further merits, the individual portions can be put into the form of units and transported to a site, and the on-site execution time thereof can be shortened. Since, however, the connection node between the cable conductor 45 of the cable terminal 40 and the conductor draw-out bar 42 exists in the interior of the polymer bushing 41, there has been the drawback that, as in <the porcelain jacket stated before, the outside diameter of the polymer bushing 41 enlarges to make the weight thereof heavy. Besides, when the diameter of the polymer bushing 41 enlarges, the projected cross-sectional area thereof becomes large. This results in the drawback that an elongated polymer bushing must be used for attaining enhancement in the characteristic of pollution withstand voltage.

Figure 10:
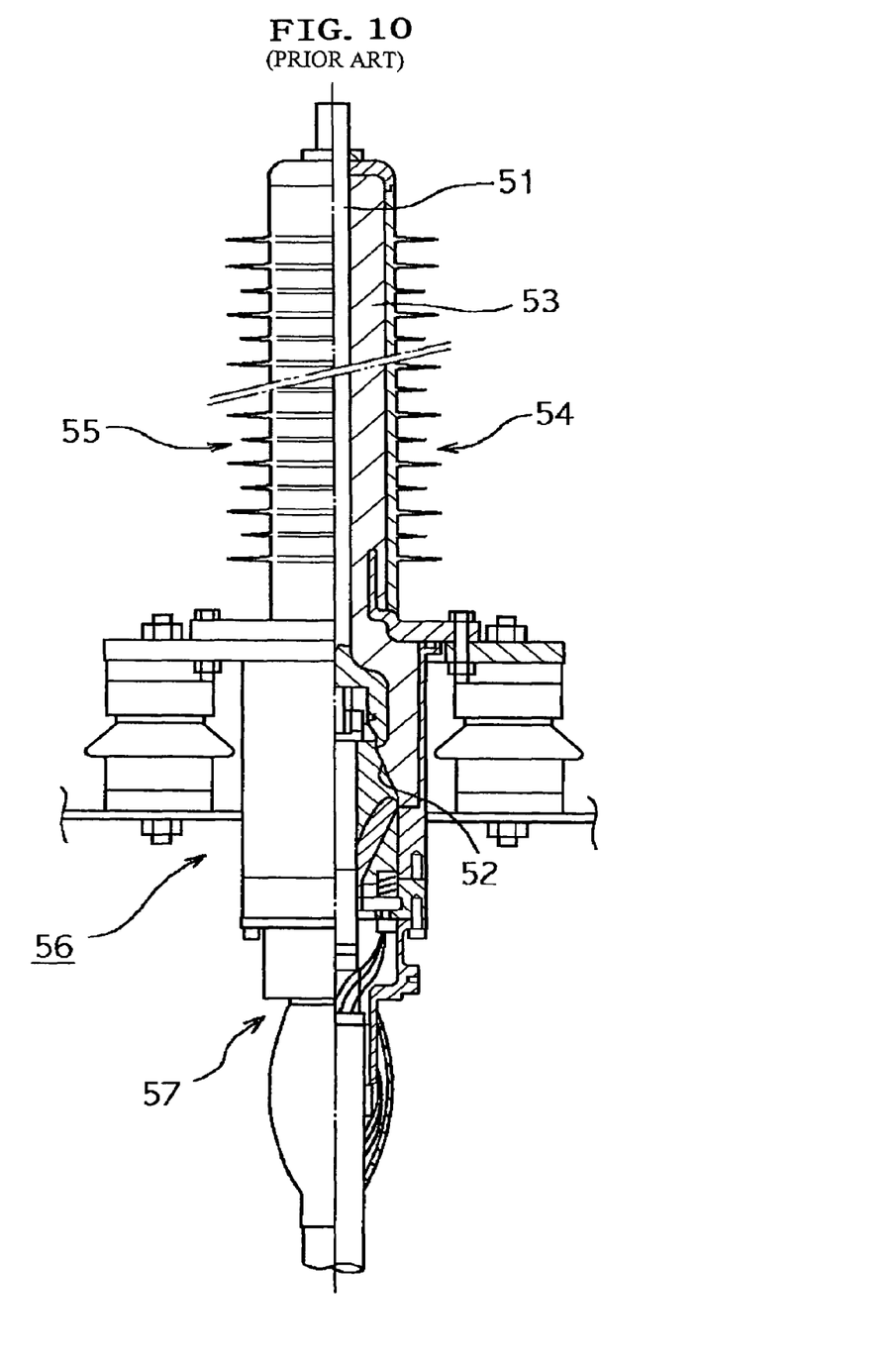
FIG. 10 is an explanatory view of the cable termination in the prior art.

Therefore, the Applicant has developed a polymer bushing 56 and filed an application before (Japanese Patent Application No. 2002-105432). As shown in FIG. 10, the polymer bushing 56 includes a hard insulation sleeve 53 which has a conductor draw-out bar 51 at the center thereof, and a receiving port 52 for a cable terminal at the lower end part thereof, and a polymer clad body 55 which is provided integrally with the outer periphery of the insulation sleeve 53 and which is formed with a large number of shades 54 at its own periphery in a manner to be spaced from one another in its longitudinal direction. Herein, the receiving port 52 is located at a position lower than the polymer clad body 55.

The polymer bushing 56 of such a construction has the following merits: In the first place, since the polymer clad body is provided integrally with the outer periphery of the hard insulation sleeve, the polymer bushing is lighter in weight and is less liable to damage than the prior-art porcelain jacket, and the handling of the polymer bushing can be more facilitated to sharply enhance a working property. Secondly, since any insulating oil or insulating gas is not required, the harmony of an environment can be attained. Thirdly, in a case where the polymer clad body is formed of a silicone polymer, the characteristic of pollution withstand voltage can be enhanced owing to the water repellency of the silicone polymer. Fourthly, since the receiving port of the insulation sleeve is located at the position lower than the polymer clad body, the polymer bushing can be made finer than the prior-art polymer bushing, and in consequence of the finer polymer bushing, the projection cross-sectional area of the polymer bushing becomes small, with the result that even a short polymer bushing can keep a predetermined characteristic of pollution withstand voltage. Fifthly, since the connection between the conductor draw-out bar and the cable conductor is made at a position lower than the polymer clad body, the step-stripped processing section of the cable terminal can be shortened. Sixthly, since an embedment metal fitting is embedded in the polymer bushing and is made integral with a bottom metal fitting, the polymer bushing can be mechanically reinforced, and it can be easily and stably mounted on a mounting stand or the like through the bottom metal fitting.

In the polymer bushing 55 of such a construction, 6 however, drawbacks as stated below have been involved.

In the first place, the thickness of the polymer bushing 55 is determined by the electric field of the outer surface of the polymer bushing 55 rather than by the allowable electric field of the insulation sleeve 53 of epoxy or the like, so that as the service voltage of a cable termination becomes higher, the insulator of the insulation sleeve 53 thickens more to consequently make the polymer bushing 55 heavier.

Secondly, as the service voltage of the cable termination becomes higher, the polymer bushing 55 is lengthened more, and the handling of the polymer bushing 55 in an installation work becomes more difficult due to the larger length conjointly with the heavier weight.

[Patent Document 1]
Japanese Utility Model No. 3,031,834 (Sector Nos. "0002"-"0004", FIG. 2)

DISCLOSURE OF THE INVENTION

The present invention has been made in order to solve the drawbacks explained above, and it has for its object to provide a polymer bushing which can achieve reduction in weight, slimming in structure, reduction in size, commonality in the types of bushings, and simplification in operating steps, and which can be installed in a flexible manner, and a cable termination which uses the polymer bushing.

A polymer bushing in the first aspect of the invention includes a hard insulation sleeve that has a conductor draw-out bar centrally, and a receiving port for a cable terminal at a lower end part thereof, and a polymer clad body that is disposed around an outer periphery of the insulation sleeve and that is formed with a large number of shades at its own outer periphery in a manner to be spaced from one another in its longitudinal direction; wherein an electric-field stress-control layer is provided on an interface between the insulation sleeve and the polymer clad body.

A polymer bushing in the second aspect of the invention includes a hard insulation sleeve that has a conductor draw-out bar centrally, and a receiving port for a cable terminal at a lower end part thereof, and a polymer clad body that is disposed around an outer periphery of the insulation sleeve and that is formed with a large number of shades at its own outer periphery in a manner to be spaced from one another in its longitudinal direction; wherein the receiving port is provided at a position lower than the polymer clad body, and an electric-field stress-control layer is provided on an interface between the insulation sleeve and the polymer clad body.

The third aspect of the invention consists in the polymer bushing in the first or second aspect, wherein a conductor insertion hole which communicates with the receiving port is provided at a lower end part of the conductor draw-out bar, and the conductor insertion hole is provided at a position lower than the polymer clad body.

A polymer bushing in the fourth aspect of the invention includes a hard insulation sleeve that has a conductor draw-out bar centrally, and a receiving port for a cable terminal at a lower end part thereof, and a polymer clad body that is disposed around an outer periphery of the insulation sleeve and that is formed with a large number of shades at its own outer periphery in a manner to be spaced from one another in its longitudinal direction; wherein an annular metal fitting is disposed concentrically with the conductor draw-out bar at a position lower than the insulation sleeve, the polymer clad body is disposed at a position higher than the metal fitting, the receiving port is provided at a position lower than the metal fitting, and an electric-field stress-control layer is provided so as to extend from an upper end part of the metal fitting to a distal end part of the conductor draw-out bar.

The fifth aspect of the invention consists in the polymer bushing in the fourth aspect, wherein the metal fitting is constructed of an embedment metal fitting for electric-field mitigation as is embedded and fixed at the position lower than the insulation sleeve.

The sixth aspect of the invention consists in the polymer bushing in each of the first through fifth aspects, wherein the electric-field stress-control layer is constructed of a zinc oxide layer or a high permittivity layer.

The seventh aspect of the invention consists in the polymer bushing in each of the first through sixth aspects, wherein the insulation sleeve is disposed integrally with an outer periphery of the conductor draw-out bar.

The eighth aspect of the invention consists in the polymer bushing in each of the first through seventh aspects, wherein a bend is provided at an intermediate part of the polymer bushing.

A cable termination in the ninth aspect of the invention comprises a cable terminal portion mounted in the receiving port of the polymer bushing in each of the first through eighth aspects.

According to the polymer bushing in each of the first through eighth aspects of the invention or the cable termination in the ninth aspect, advantages as stated below are attained.

In the first place, since the surface electric field of the polymer bushing can be mitigated by the electric-field stress-control layer which is disposed on the interface between the insulation sleeve and the polymer clad body, the insulation sleeve can be thinned, with the result that the polymer bushing can be made lighter in weight and slimmer in structure than the prior-art polymer bushing shown in FIG. 10.

Secondly, owing to the mitigation of the surface electric field of the polymer bushing, reduction in bushing length can be achieved.

Thirdly, the out-door termination which is lighter in weight and slimmer in structure is applied to an ultrahigh voltage cable, whereby reduction in subsidiary works can be achieved.

Fourthly, in the case where the receiving port of the insulation sleeve is located at the position lower than the polymer clad body, the polymer bushing can achieve the compatibility of the types of bushings and the simplification of operating steps likewise to the prior-art polymer bushing shown in FIG. 10, and it can be installed in a flexible manner.

Fifthly, since the embedment metal fitting is embedded in the polymer bushing and is made integral with a bottom metal fitting, the polymer bushing can be mechanically reinforced, and it can be easily and stably mounted on a mounting stand or the like through the bottom metal fitting.

Sixthly, in the case where the bend is provided at the intermediate part of the polymer bushing, a separation can be satisfactorily ensured even when the polymer bushing is installed in a substation or the like having a low ceiling.

BEST MODE FOR CARRYING OUT THE INVENTION

Now, the preferred embodiments of a polymer bushing and a cable termination using the polymer bushing, in the present invention, will be described with reference to the drawings. Here, FIG. 1 shows a partly sectional view of an out-door termination for a CV cable of 22-77 kV class as uses the polymer bushing in the invention.

Figure 1:
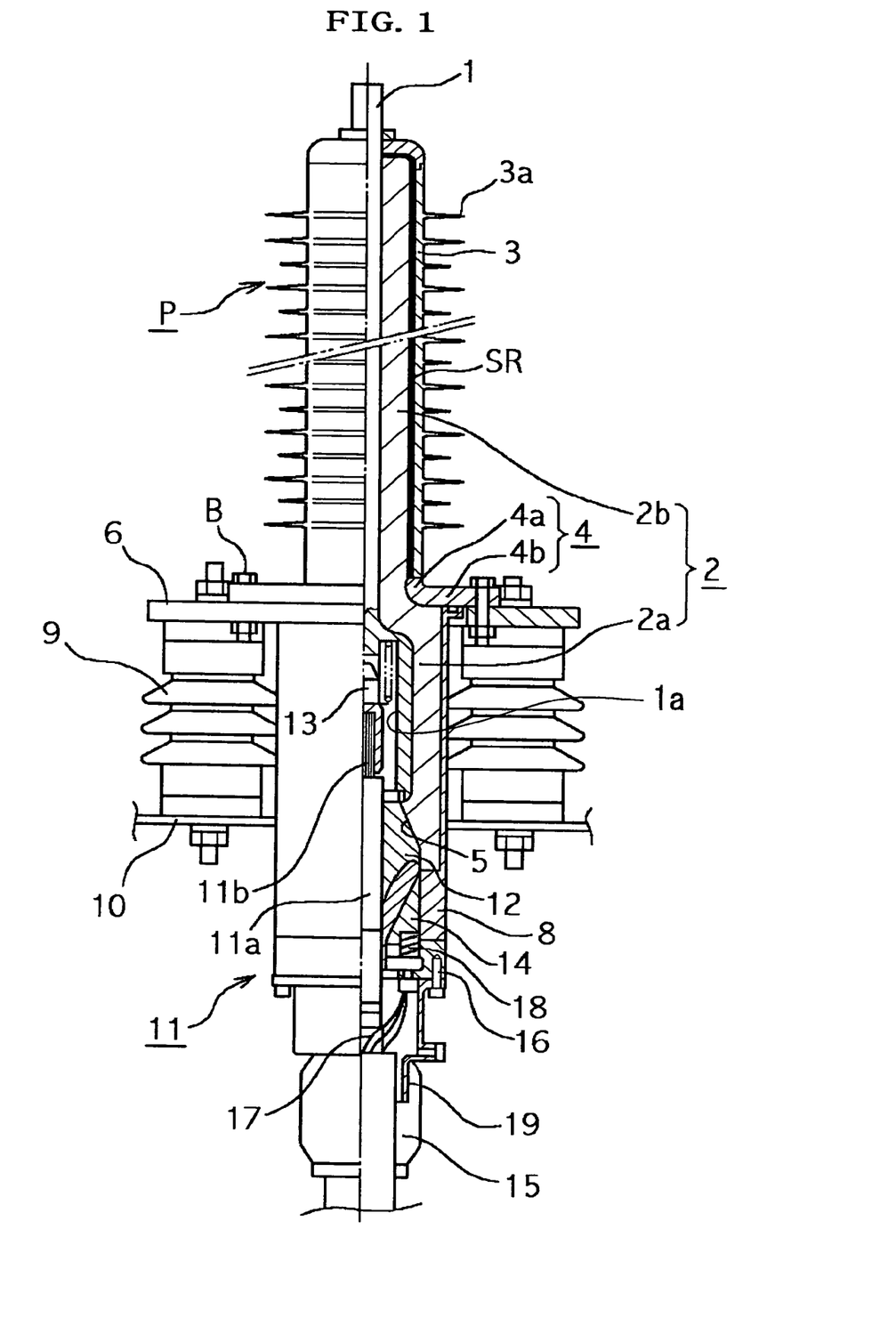
FIG. 1 is a partly sectional view of a cable termination in the present invention.

Referring to FIG. 1, the polymer bushing P of the invention includes a conductor draw-out bar 1 which is centrally disposed and which has a conductor insertion hole 1a at the lower end part thereof, a hard insulation sleeve 2 which is provided around the outer periphery of the conductor draw-out bar 1, an electric-field stress-control layer SR which is provided around the outer periphery of the insulation sleeve 2, and a polymer clad body 3 which is provided around the outer periphery of the electric-field stress-control layer SR. Here, the insulation sleeve 2 is formed of a material of high mechanical strength, for example, a hard plastic resin such as epoxy resin or FRP, the electric-field stress-control layer SR is formed of, for example, an ZnO layer in which an elastomer material is filled with zinc oxide powder, or a high permittivity layer whose relative permittivity is at least 10 and which is made of a rubber and the like filled with a conductive filler such as carbon black, and the polymer clad body 3 is formed of a material of superior electric insulation performance, for example, a high-molecular insulating material such as silicone polymer. The conductor draw-out bar 1, insulation sleeve 2, electric-field stress-control layer SR and polymer clad body 3 are integrally formed by molding.

The insulation sleeve 2 includes a large-diameter insulation sleeve 2a which is provided around the outer periphery of the lower part of the conductor draw-out bar 1, that is, around the outer periphery of a part corresponding to the conductor insertion hole 1a, and a small-diameter insulation sleeve 2b which is connected to the upper part of the large-diameter insulation sleeve 2a and which is provided around the outer periphery of the part of the conductor draw-out bar 1 except the distal end part thereof. An embedment metal fitting 4 for electric field mitigation is embedded in the part of the connection between the large-diameter insulation sleeve 2a and the small-diameter insulation sleeve 2b. Besides, a cone-shaped receiving port 5 which receives the stress cone of a cable terminal to be stated later is provided in the lower end part of the large-diameter insulation sleeve 2a, and this receiving port 5 is held in communication with the conductor insertion hole 1a of the conductor draw-out bar 1. Here in this embodiment, the part corresponding to the conductor insertion hole 1a is made larger in diameter than the small-diameter insulation sleeve 2b, but it may well be equalized in diameter to the small-diameter insulation sleeve 2b.

The polymer clad body 3 is provided around the outer periphery of the small-diameter insulation sleeve 2b, and it is formed with a large number of shades 3a at its own periphery in a manner to be spaced from one another in its longitudinal direction.

The embedment metal fitting 4 includes a conical bend 4a which is embedded concentrically with the conductor draw-out bar 1 at the lower part of the small-diameter insulation sleeve 2b, and an annular flange portion 4b which is connected to the lower end part of the bend 4a and which is embedded so that its outer peripheral edge may extend horizontally from the outer periphery of the upper position of the large-diameter insulation sleeve 2a. An annular bottom fitting 6 is fixed to the lower end surface of the outer peripheral edge of the flange portion 4b through clamp bolts B. Here, the bend 4a constituting the embedment metal fitting 4 has its outside diameter substantially equalized to the outside diameter of the polymer clad body 3, and it has its inside diameter made somewhat smaller than the inside diameter of the electric-field stress-control layer SR. Besides, the lower end part of the electric-field stress-control layer SR is held in electrical contact with the upper end part of the bend 4a, while the upper end part thereof is held in electrical contact with the upper end part of the conductor draw-out bar 1. By the way, in the figure, numeral 8 designates a protective metal fitting which is disposed around the outer periphery of the large-diameter insulation sleeve 2a and whose upper end part is attached to the lower surface of the flange portion 4b of the embedment metal fitting 4.

Next, there will be described a cable termination which uses the polymer bushing of the invention.

Referring to FIG. 1, the polymer bushing P is first attached to a supporting stand 10 through supporting insulators 9 which are disposed on the lower surface of the bottom fitting 6. Besides, as in the prior-art cable terminal, the stress cone 12 is mounted on the outer periphery of a cable insulator 11a which has been exposed by subjecting the cable end to a step-stripped process, and a conductor terminal 13 is attached to the distal end part of a cable conductor 11b. Here, the stress cone 12 is formed of a premolded insulator or the like which has the rubbery elasticity of ethylene-propylene rubber (EP rubber) or the like, and the distal end part of this stress cone 12 is provided with a pencil-like cone-shaped portion which is mounted on the inwall surface of the receiving port 5.

The cable terminal 11 of such a construction is inserted into the receiving port 5 of the polymer bushing P, and a pressing metal fitting 14 which has been disposed on the side of the cable terminal beforehand is compressed onto the side of the receiving port 5. Thus, the conductor terminal 13 is plugged into and connected with the conductor insertion hole 1a of the conductor draw-out bar 1, and the cone-shaped portion of the stress cone 12 is pressed against the inwall surface of the receiving port 5, with the result that the insulation performance of the interface between the inwall surface of the receiving port 5 and the outer peripheral surface of the cone-shaped portion is ensured.

By the way, in the figure, numeral 15 designates a sealing portion, numeral 16, a pressing metal fitting flange; numeral 17, a grounding conductor; numeral 18, a spring; and numeral 19, a protective metal fitting.

Figure 2:
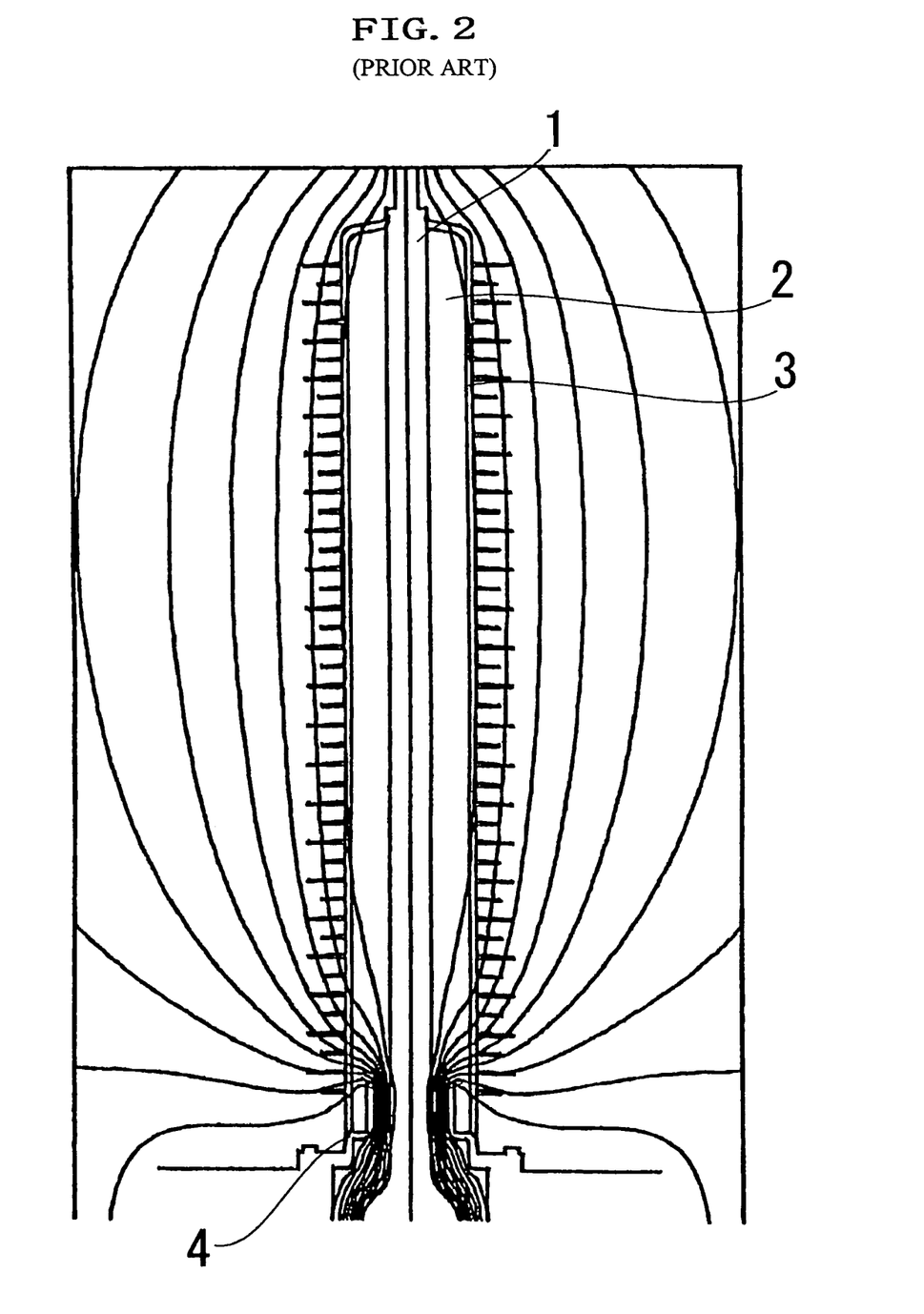
FIG. 2 is an electric-field analysis diagram in a cable termination in the prior art.
Figure 3:
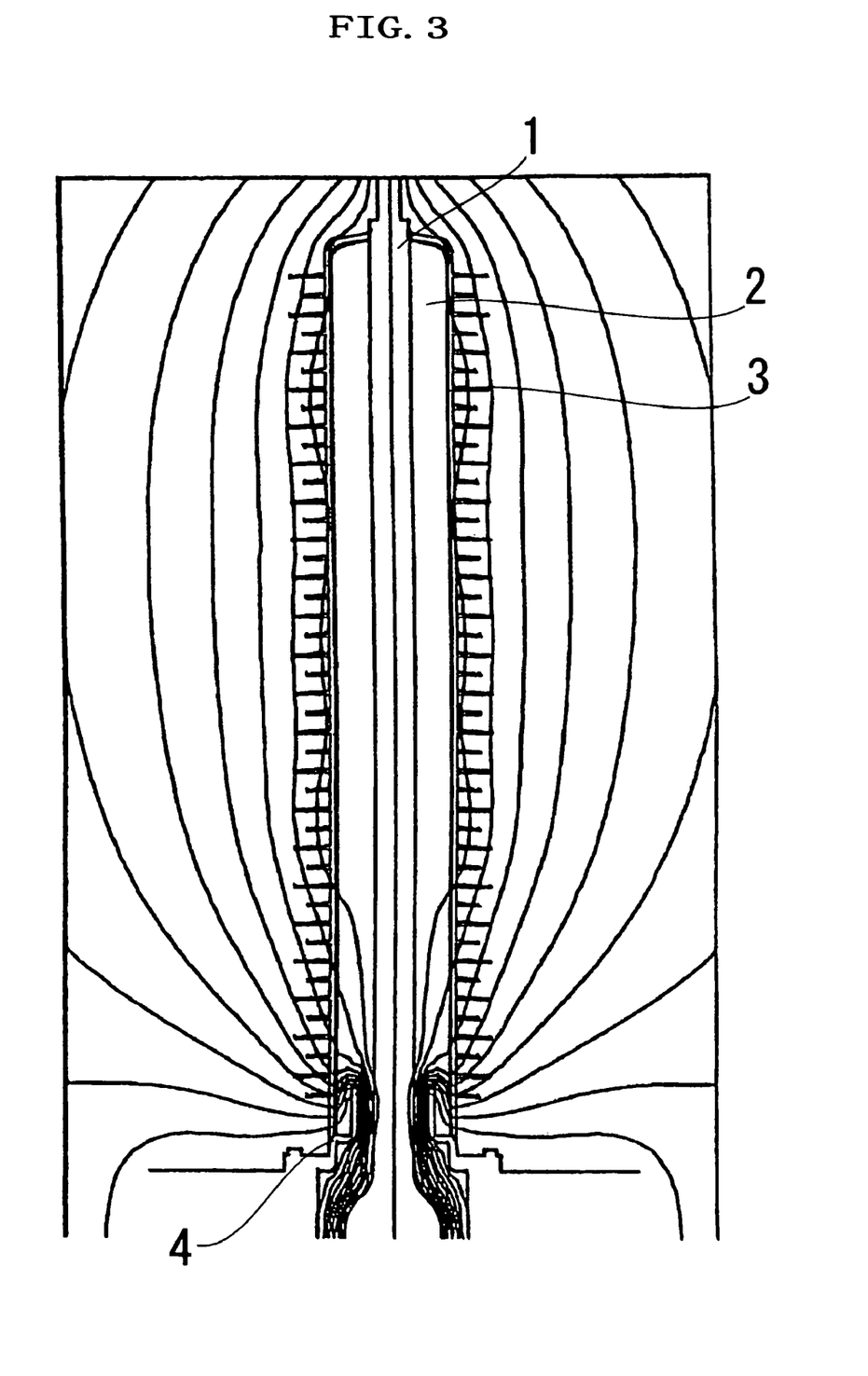
FIG. 3 is an electric-field analysis diagram in the cable termination in the invention.

FIG. 2 shows an electric-field analysis diagram in the prior-art cable termination shown in FIG. 10, while FIG. 3 shows an electric-field analysis diagram in the cable termination of the invention.

It is seen from FIG. 2 that, in the prior-art cable termination which does not include the electric-field stress-control layer SR, an electric field at the outer surface of the polymer bushing P becomes nonuniform and concentrates in the vicinity of the shield electrode (embedment metal fitting 4). Here, in such a cable termination in which a potential distribution at the outer surface of the polymer bushing is nonuniform, there are drawbacks as stated below. In general, an insulator such as epoxy resin or silicone rubber has a sufficient insulation performance in itself, and it forms no hindrance to a field intensity in itself. However, when the electric field heightens, a corona discharge develops at the outer surface of the polymer bushing. In a case where such corona discharges have developed over a long term, the silicone rubber forming the polymer clad body undergoes chemical erosion and deteriorates. Besides, in order to prevent such corona discharges from appearing, the field intensity at the surface in-air of the polymer bushing needs to be lowered. In the prior-art cable termination, therefore, the lowering of the field intensity has been coped with by thickening the insulation sleeve. More specifically, the insulation sleeve presents a circular cross section, and the field distribution becomes radial on the circular cross section. Therefore, when the insulation sleeve is thickened, the electric field at the surface of the insulation sleeve can be lowered substantially in inverse proportion to the thickness of the insulation sleeve.

However, when the insulation sleeve is thickened, lowering in a salt contamination characteristic is incurred by increase in the surface area of an out-door termination, and the polymer bushing becomes larger in size and requires the insulating materials in larger amounts, resulting in the drawback that the cable termination becomes heavier in weight and higher in cost.

On the other hand, in the cable termination of the invention including the electric-field stress-control layer SR, it is seen from FIG. 3 that an electric field at the outer surface of the polymer bushing P becomes uniform and has its concentration mitigated in the vicinity of the shield electrode (embedment metal fitting 4). In this manner, according to that cable termination of the invention in which the electric-field stress-control layer SR is disposed on the interface between the insulation sleeve 2 and the polymer clad body 3, the electric field at the surface of the polymer bushing P is mitigated, and hence, the insulation sleeve can be made thinner in insulation thickness than in the prior-art cable termination shown in FIG. 10, with the result that a lighter weight and a slimmer structure can be achieved. Moreover, owing to the mitigation of the surface electric field of the polymer bushing P, the length of the polymer bushing P can be reduced, and hence, the installation work of the cable termination of the invention can be performed more easily than that of the cable termination shown in FIG. 10, in cooperation with the lighter weight of the bushing. Furthermore, the out-door termination which is lighter in weight and smaller in size can be applied to an ultrahigh voltage cable, with the result that reduction in subsidiary works, etc. can be achieved.

FIGS. 4-7 show other embodiments of the cable termination of the invention. By the way, in the figures, portions which are common to those in FIG. 1 are assigned the same numerals and signs, and they shall be omitted from detailed description.

Figure 4:
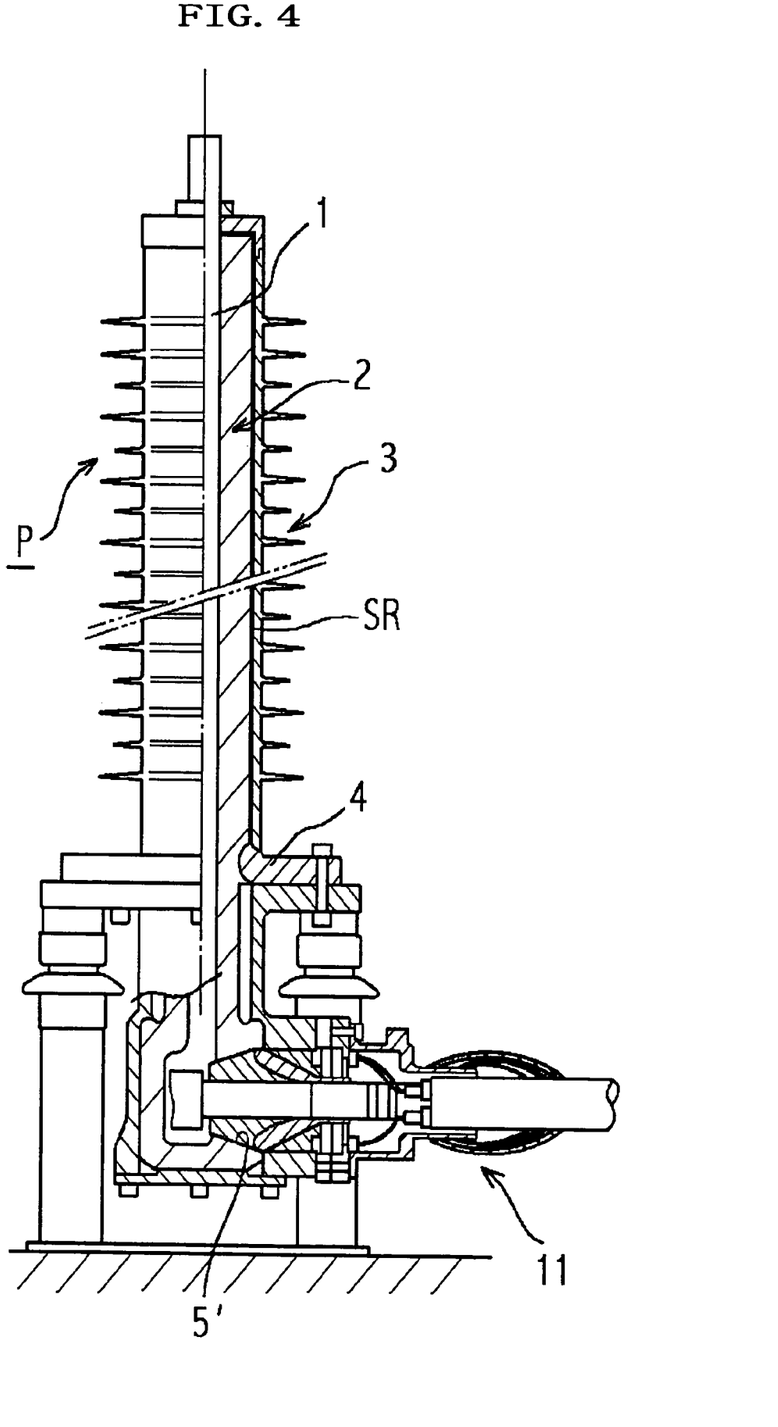
FIG. 4 is a partly sectional view of a cable termination according to another embodiment of the invention.

In the embodiment shown in FIG. 4, a cone-shaped receiving port 5' which receives the stress cone 12 of the cable terminal 11 in the polymer bushing P is bent so as to extend in a horizontal direction. According to this embodiment, the cable terminal 11 can be attached in the horizontal direction.

Figure 5:
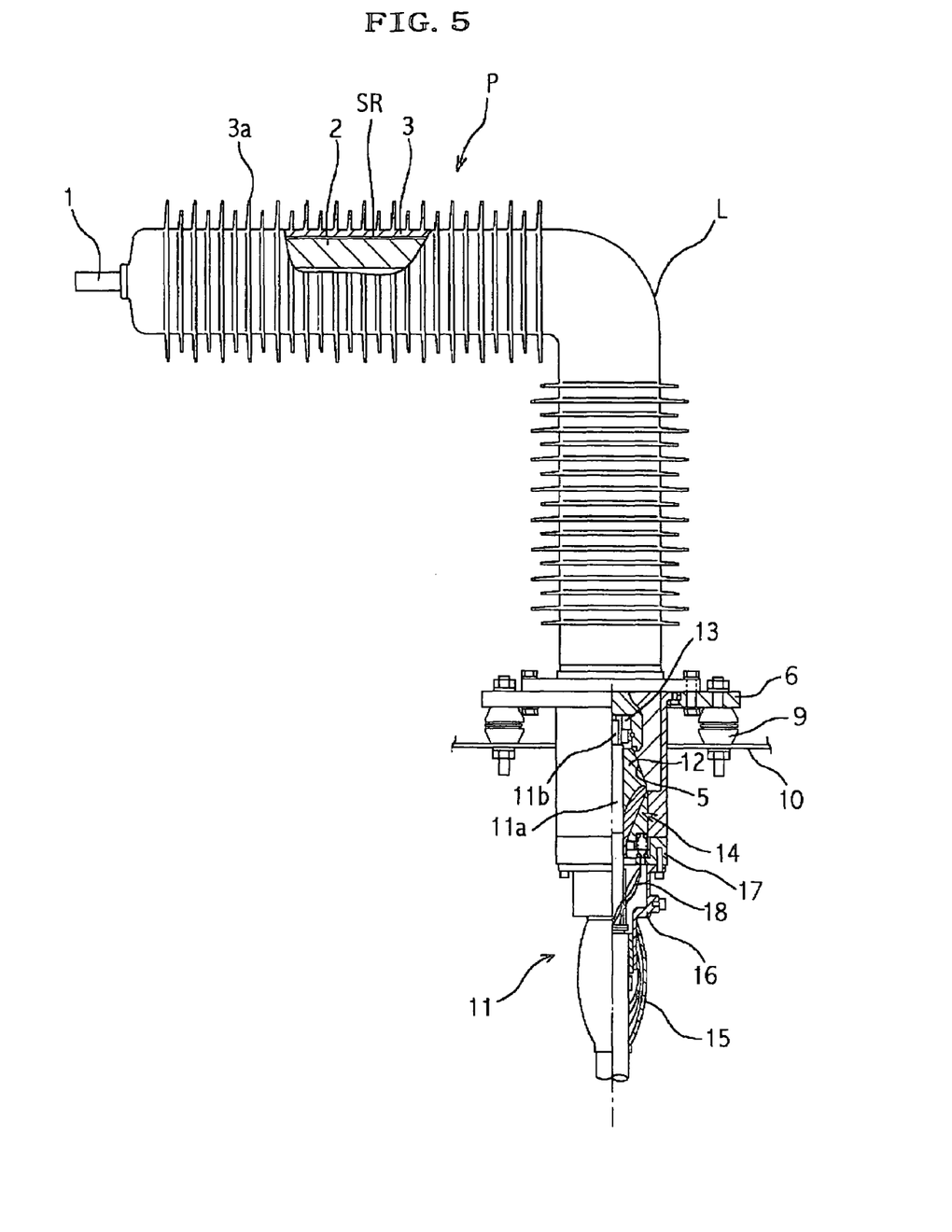
FIG. 5 is a partly sectional view of a cable termination according to another embodiment of the invention.

In the embodiment shown in FIG. 5, an L-shaped bend L is provided at the intermediate part of the polymer bushing P.

When the polymer bushing P having the bend L as shown in FIG. 5 is installed in a substation or the like having a low ceiling, the separation between the ceiling and the charging section of the polymer bushing P can be satisfactorily ensured in spite of the low ceiling of the substation or the like.

Figure 6:
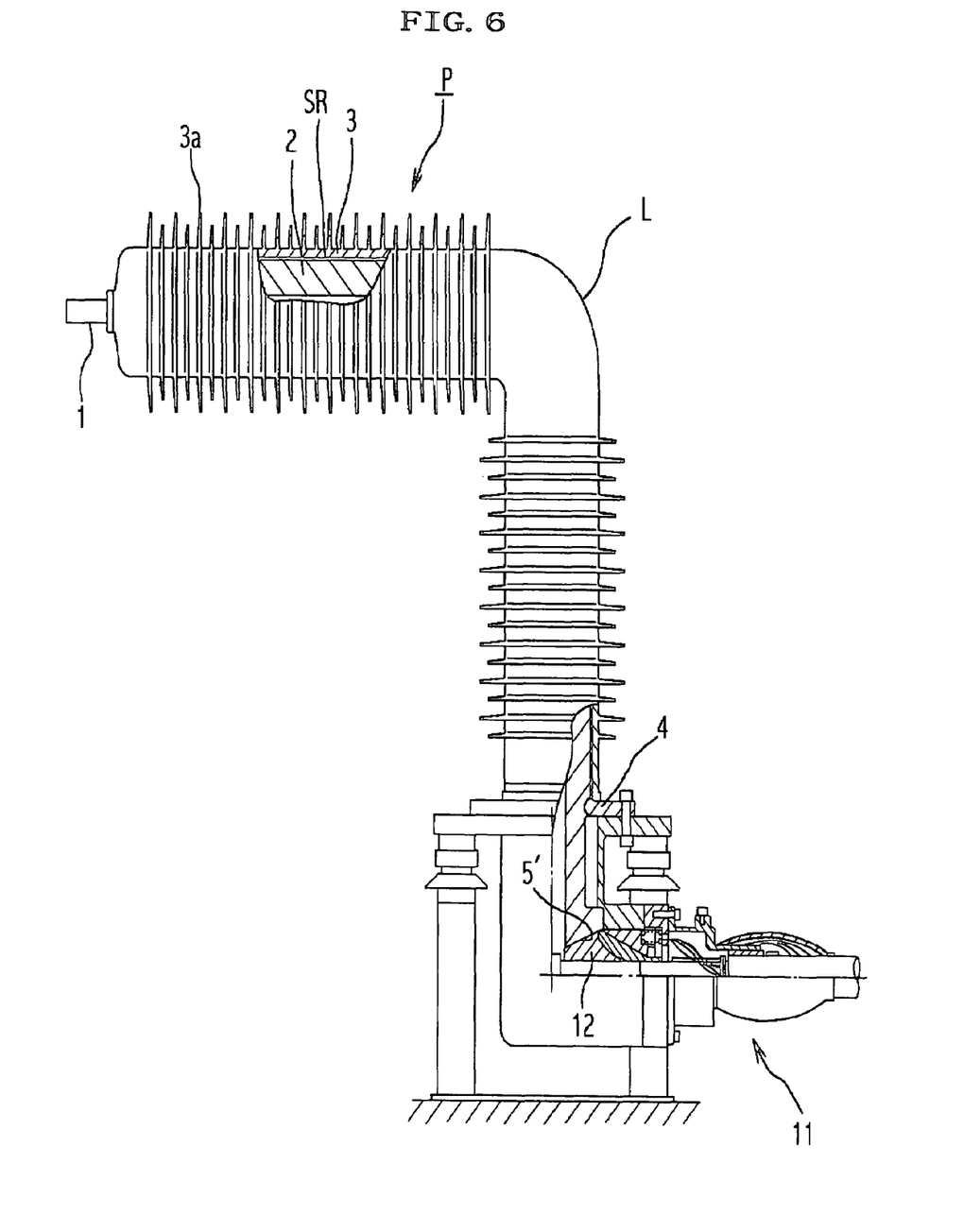
FIG. 6 is a partly sectional view of a cable termination according to another embodiment of the invention.

In the embodiment shown in FIG. 6, a cone-shaped receiving port 5' which receives the stress cone 12 of the cable terminal 11 in the polymer bushing P is bent so as to extend in a horizontal direction as in the embodiment shown in FIG. 4, and an L-shaped bend L is provided at the intermediate part of the polymer bushing P.

According to this embodiment, the cable terminal 11 can be attached in the horizontal direction, and even when the polymer bushing P is installed in a substation or the like having a low ceiling, the separation between the ceiling and the charging section of the polymer bushing P can be satisfactorily ensured.

Figure 7:
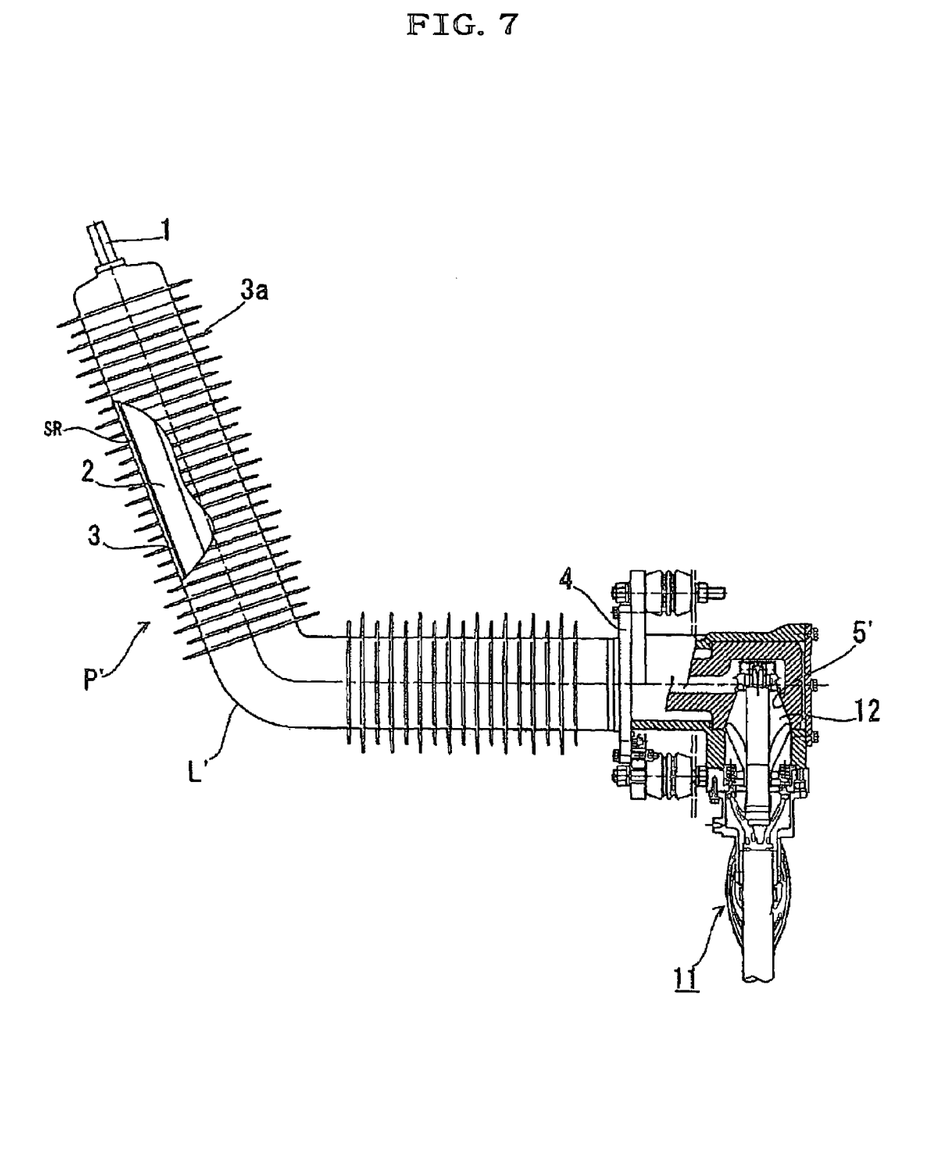
FIG. 7 is a partly sectional view of a cable termination according to another embodiment of the invention.

In the embodiment shown in FIG. 7, a bend L' which is bent so as to present an obtuse angle on the order of 100 degrees-150 degrees is provided at the intermediate part of a polymer bushing P'.

INDUSTRIAL APPLICABILITY

In the foregoing embodiments, the present invention has been described in conjunction with the specified aspects of performance shown in the drawings, but the invention is not restricted to these aspects of performance, and it may well be altered as stated below, as long as the advantages thereof are attained.

In the first place, the polymer bushing is not restricted to one in which its receiving port is located at the position lower than the polymer clad body, but a receiving port may well be provided within the lower end part of the polymer clad body as shown in FIG. 9 by way of example.

Secondly, the polymer bushing is not restricted to one which is provided with the substantially L-shaped bend at the intermediate part thereof, but it may well be provided with a semicircular bend.

Thirdly, the insulation sleeve which is disposed around the outer periphery of the conductor draw-out bar may well be provided as a member separate from the conductor draw-out bar.

Fourthly, the receiving port for the cable terminal is not restricted to one which is provided at the lower position or extended in the horizontal direction, but it may well be formed obliquely by way of example.

Fifthly, the cable termination is not restricted to the out-door termination, but it may well be applied to gas and oil terminations.

The invention claimed is:

1. A polymer bushing comprising:
   a hard insulation sleeve extending along a longitudinal axis from an upper distal end to a lower end and surrounding and molded integrally with a central conductor bar extending along the longitudinal axis;
   a receiving port, for receiving a stress cone of a cable terminal, in the lower end of the hard insulation sleeve;
   an electric-field stress-control layer surrounding the insulation sleeve;
   a polymer cladding disposed around an outer periphery of the stress-control layer, extending from a lower end thereof to the upper distal end of the hard insulation sleeve, and having a plurality of longitudinally spaced shades on its outer periphery;
   an annular metal fitting concentric with the conductor bar and embedded in and fixed to the hard insulating sleeve, the annular metal fitting including a flange located at a position longitudinally between the lower end of the polymer cladding and the receiving port; and
   wherein the electric-field stress-control layer is disposed at an interface between the hard insulation sleeve and the polymer cladding, is in contact with the annular metal fitting and extends longitudinally from the annular metal fitting toward the upper distal end of the hard insulating sleeve.

2. A polymer bushing as defined in claim 1, wherein the metal fitting provides electric-field mitigation.

3. A polymer bushing as defined in claim 1, wherein the electric-field stress-control layer is a zinc oxide layer or a high permittivity layer.

4. A polymer bushing as defined in claim 1 having a bend at a position intermediate its ends.

5. A cable termination wherein a cable terminal portion is mounted in the receiving port of the polymer bushing as defined in claim 1.

6. A polymer bushing as defined in claim 4 wherein the bend is at 100-150°.

7. A polymer bushing as defined in claim 4 wherein the bend is at 90°.

8. A polymer bushing as defined in claim 1 wherein the electrical-field stress-control layer and the polymer cladding cover the distal end of the hard insulation sleeve.

9. A polymer bushing as defined in claim 1 the hard insulation sleeve has large-diameter and small-diameter portions integrally formed and meeting at a shoulder and wherein the annular metal fitting is seated on the shoulder.

10. A polymer bushing as defined in claim 1 wherein the receiving port includes a cone-shaped portion.

11. A polymer bushing as defined in claim 1 wherein the conductor bar, the hard insulation sleeve, the electric-field stress control layer and the polymer cladding are integrally formed by molding.

12. A polymer bushing as defined in claim 1 wherein the hard insulation sleeve is an epoxy or fiber reinforced plastic.

13. A polymer bushing as defined in claim 1 wherein the annular metal fitting is in contact with lower ends of both the electric-field stress-control layer and the polymer cladding.

* * * * *